Figures 4, 5:
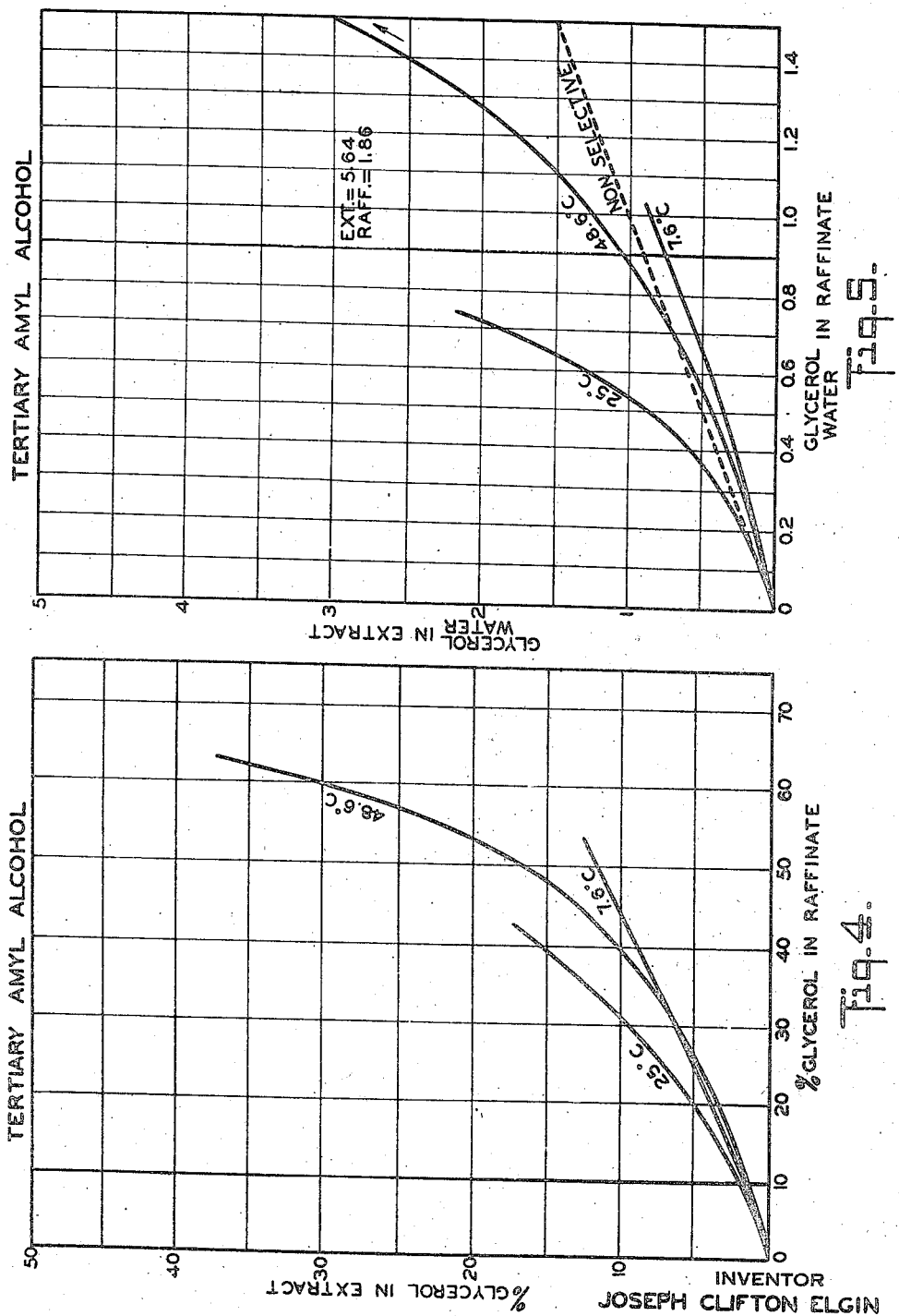

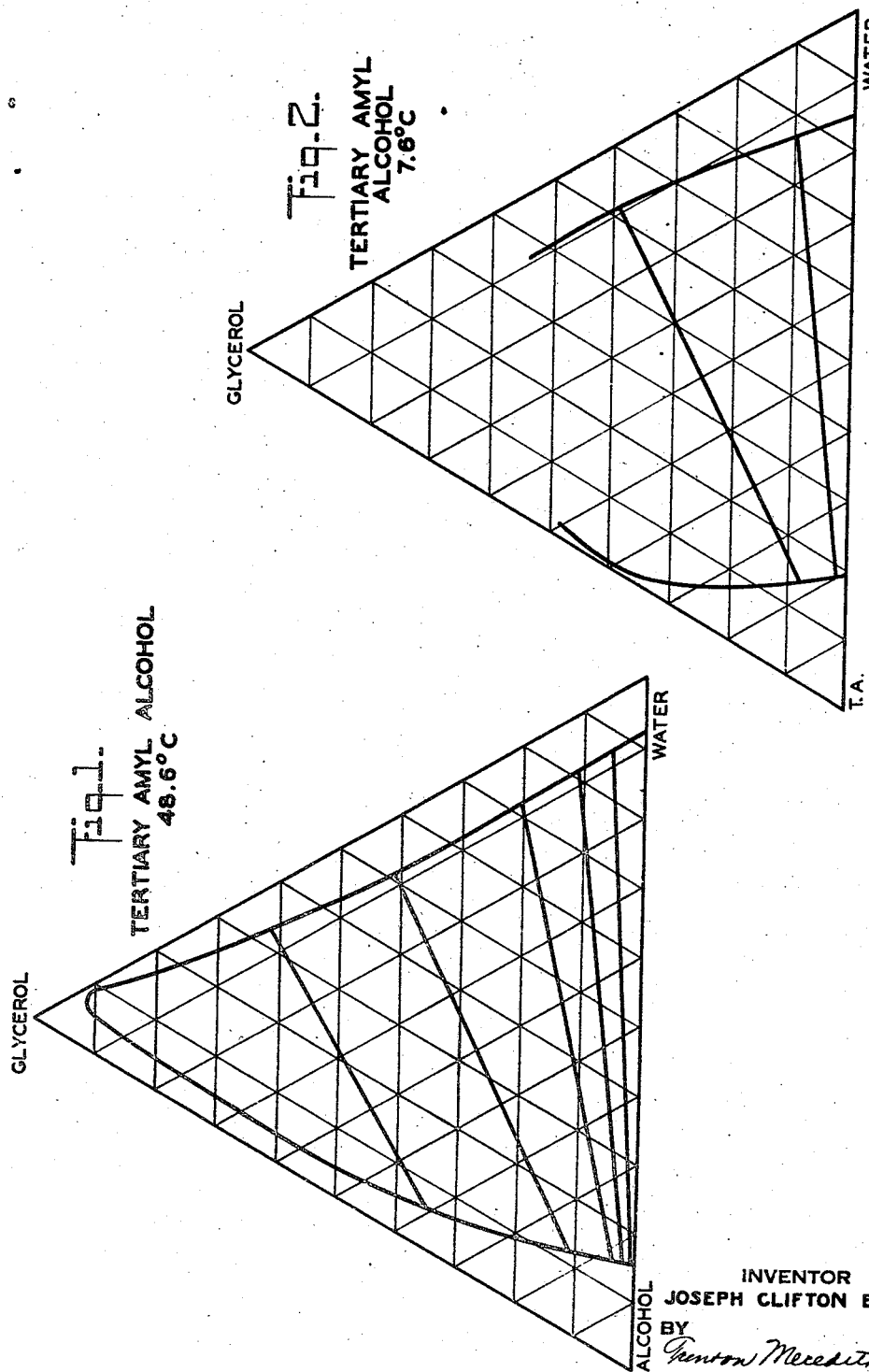

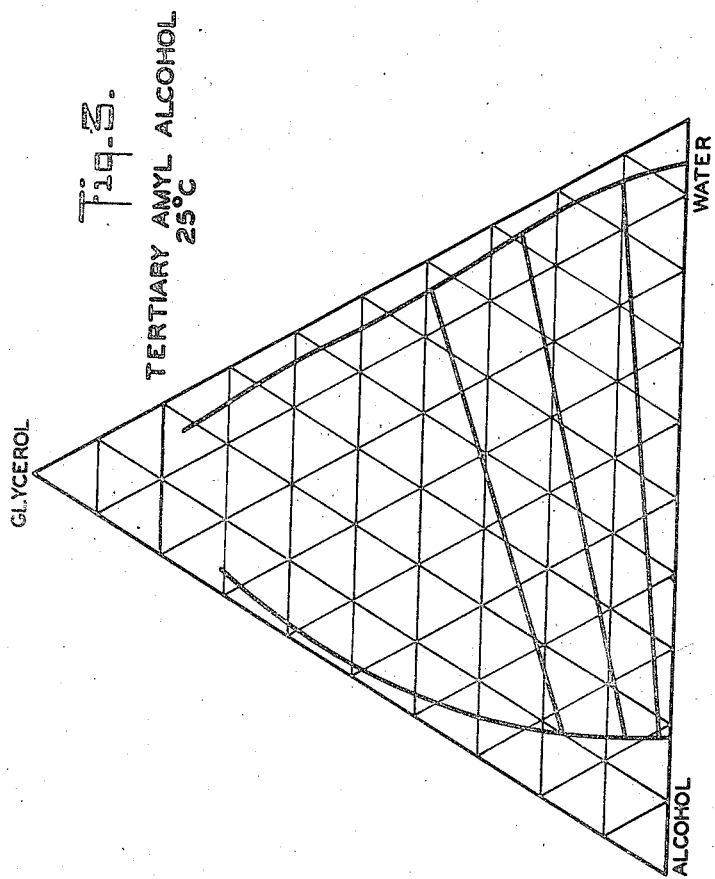

Feb. 17, 1948.    J. C. ELGIN    2,436,209
EXTRACTION OF POLYHYDRIC ALCOHOLS
Filed Sept. 18, 1943    4 Sheets-Sheet 3

INVENTOR
JOSEPH CLIFTON ELGIN
BY
Trenton Meredith
ATTORNEY

Patented Feb. 17, 1948

2,436,209

UNITED STATES PATENT OFFICE 2,436,209

EXTRACTION OF POLYHYDRIC ALCOHOLS

Joseph Clifton Elgin, Princeton, N. J., assignor to Colgate-Palmolive-Peet Company, Jersey City, N. J., a corporation of Delaware Application September 18, 1943, Serial No. 502,929

12 Claims. (Cl. 260—637)

This invention relates to a method of treating water-soluble polyhydroxy organic materials in solutions containing the same, and more particularly it relates to methods of purifying, concentrating, extracting and recovering glycerine and/or other polyhydric alcohols from aqueous solutions thereof.

Applicant is aware of the prior art which suggests the use of certain solvents for the extraction of glycerine from concentrated distillers' slop and fermented mashes. Those disclosures were directed to processes in which the concentrate was formed by evaporating all or substantially all of the water contained therein. Such a process is generally termed "leaching" and is not liquid-liquid extraction because it does not depend upon the formation of liquid layers, that is, two immiscible liquid phases one of which is aqueous. The process of leaching necessitates the consumption of heat sufficient to evaporate the water, heretofore thought necessary to a proper recovery of the glycerine. This heat requirement involves economies different from those of liquid-liquid extraction, resulting in a higher cost of the glycerine recovery. The process of leaching involves principles different from those of liquid-liquid extraction.

Applicant is also aware of the fact that amyl alcohol has been proposed for the extraction of glycerine from distillers' slop and other fermented mash materials. According to the prior art, it was thought necessary to heat the amyl alcohol in order for it to dissolve the glycerine. Subsequently, the hot amyl alcohol extract was separated from the fermented material and cooled to throw the glycerine out of solution in the amyl alcohol. The economies of such a process apparently have prevented its adoption in the industry.

It has now been discovered that relatively concentrated, pure glycerine may be recovered from aqueous glycerine solutions by the use of tertiary amyl alcohol (dimethyl ethyl carbinol). The present invention, therefore, comprises a process for effecting the separation of glycerine and water from a mixture thereof by liquid-liquid extraction with tertiary amyl alcohol. This process is carried out under such conditions that two liquid layers or phases are formed in which the glycerine-to-water ratios are substantially different from each other and from that of the original crude mixture. Depending upon the temperature at which the extraction operation is conducted and the concentration of glycerine in the aqueous glycerine feed to be extracted, the tertiary amyl alcohol extract phase will be poorer or richer in glycerine, on a solvent-free basis, than the original mixture being treated. The glycerine may be concentrated and purified whether the glycerine-to-water ratio is higher or lower in the solvent phase than in the aqueous phase by the process of the present invention, so long as the ratio is different and the solvent dissolves a substantial quantity of either the water or the glycerine. In other words, the process is operative if the solvent selectively and preferentially dissolves glycerine or water under conditions at which two liquid phases are formed.

The applicant is the first to discover that even though tertiary amyl alcohol is used under conditions which render it water-selective, as for example at 7.6° C., it may be used to concentrate aqueous glycerine solutions. Under such conditions, although the extract phase will contain a lower ratio of glycerine to water than the original mixture, the glycerine in the raffinite will be recovered in a more concentrated form. When using tertiary amyl alcohol at room temperature, 25° C., or at more elevated temperatures on fairly concentrated aqueous glycerine solutions, over 50%, the tertiary amyl alcohol is glycerine-selective and the extract phase will contain a higher glycerine content, on a solvent-free basis, than the original solution.

Applicant has discovered that tertiary amyl alcohol will selectively extract glycerine under certain conditions, but that it will selectively extract water under other conditions.

As stated hereinbefore, the process in general constitutes extracting an aqueous mixture containing glycerine with tertiary amyl alcohol under such conditions that two liquid phases are formed; that the selectively dissolved material, either glycerine or water, is dissolved in the extract phase to a practical extent; and that one of the liquid layers contains glycerine in proportion to water substantially different from that in the other layer and in the starting material. The result is thereby to remove the glycerine or water preferentially from the original mixture, and thus concentrate the glycerine. No procedure described in the prior art includes such a true liquid-liquid glycerine extraction process.

The invention herein described also contemplates the liquid-liquid extraction of crude liquid aqueous glycerine mixtures containing in addition dissolved and/or suspended inorganic and/or organic impurities, such mixtures being derived from any source, for the purpose of obtaining an extracted glycerine of both higher concentration relative to water and containing substantially none or only small quantities of undesirable impurities, such as, for example, inorganic compounds, salts and alkalies (e. g., sodium chloride, caustic soda, sodium carbonate and iron acetate), colored bodies, nitrogenous substances, organic salts and fatty acids. While it is usually desired to attain both objects (purification and concentration of glycerine), it is not intended to limit the invention thereto, since it may also be employed solely to concentrate an aqueous glycerine of any degree of purity by preferentially dissolving the water, or the glycerine, therefrom. Or, it may be applied solely for the purpose of extracting and stripping substantially completely a glycerine of greater purity and having, for example, a lower salts-, caustic- and color-content, from an impure crude aqueous glycerine mixture, without necessarily effecting a concentration of glycerine thereby.

The invention may be applied to the extraction, purification and concentration of glycerine in such aqueous mixtures as soap lyes, saponification liquors, or other glycerine-containing liquors derived from the hydrolysis of fats and oils in the manufacture of soap and fatty acids, mixtures obtained therefrom by evaporation or other treatment, e. g., crude concentrated glycerines; fermentation liquors and slops derived from the fermentation of molasses or other carbohydrate-containing material carried out either for the production of glycerine or for alcohols the production of and similar substances; and crude aqueous glycerine liquors derived synthetically, for example, by the chlorination of propylene and the subsequent hydrolysis or hydrinolysis of the chlorinated hydrocarbon.

While it is proposed to extract the glycerine from its mixtures without prior chemical or adsorption treatment or exaporation thereof, it will be understood that chemical or adsorption treatment and/or partial concentration of such mixtures by evaporation or distillation prior to the extraction, so long as there remains a liquid phase, may be carried out without departing from the spirit of this invention. It is possible to employ chemical or adsorption treatment or concentration subsequent to the extraction. The concentration may be effected by any suitable method.

Because of the unique extraction properties which applicant has found that tertiary amyl alcohol possesses for treating aqueous glycerine solutions, it is possible, by properly adjusting the temperature in relation to the glycerine content of the aqueous solution, to extract with this solvent either the glycerine preferentially to water, thus producing a more concentrated glycerine from the extract, or water preferentially to glycerine, producing a more concentrated glycerine in the raffinate. By using a temperature of about 10° C. and below (but above the solidifying point) applicant extracts water preferentially from an aqueous glycerine feed of any concentration, say up to 80–85% glycerine content, thus concentrating the glycerine further in the raffinate. At temperatures roughly between 15° C. and 30° C., applicant is able also to produce a similar result with aqueous glycerines containing up to about 15% glycerine. By using temperatures of roughly 35° C. to 60° C., applicant is able further to produce a similar result with glycerine up to about 40%. By using temperatures of from 15° C. to 30° C., applicant is able to extract glycerine preferentially to water from aqueous glycerine containing over 15% glycerine to recover glycerine from the feed and produce a more concentrated glycerine extract.

Tertiary amyl alcohol is particularly suitable for extracting partially concentrated aqueous glycerine solutions containing upwards of 50% glycerine. The partially concentrated solution treated may have been obtained in any suitable manner, as by distillation, evaporation, or by prior solvent extraction step as disclosed in my copending case, Serial No. 349,595, filed August 2, 1940, or by a combination of distillation and solvent extraction steps. The tertiary amyl alcohol is used preferably at a temperature between 20° C. and 50° C. for the solvent extraction step, and is glycerine-selective. Depending upon the concentration of the solution being treated, the quantity of solvent employed and the temperature of the extraction mixture, a substantially water-free glycerine or very highly concentrated aqueous solution of glycerine is obtained, as will be described more fully hereinafter.

Tertiary amyl alcohol may be used with other suitable solvents in the manner disclosed in my prior application Serial No. 349,595, referred to above. For example, at low temperatures where the tertiary amyl alcohol is water-selective, it may be mixed with n-butyl alcohol which is also water-selective. On the other hand, at elevated temperature and concentrations where the tertiary amyl alcohol is glycerine-selective, it may be used mixed with tertiary butyl alcohol, isopropanol or aniline, or other glycerine-selective solvent or solvents.

In separating glycerine and water, extracting and concentrating glycerine with organic solvents, the conditions of the extraction may be varied, e. g., temperature, quantity of solvent employed, and the number of contacts between the solvent and the aqueous glycerine phase. Any known type of equipment and mechanical details of operation may be employed. The extraction may be intermittent or continuous, as is best adapted to secure the most efficient technical and economic results. In employing columns, it is possible to use unpacked or packed towers having plates or baffles therein. It is possible to pass the solvent or the disperse phase through the aqueous layer or to pass the aqueous layer through the solvent. Settling areas may be provided at the top or bottom of the columns or suitable settling chambers may be provided outside the tower. Centrifugal means may be provided for accelerating separation of the phases from either the continuous or multiple stage extraction systems.

When treating solutions containing 20% or more glycerine, it is preferred to extract at temperatures between about 15° C. and 75° C., usually at ordinary room temperature. Ordinarily, it is preferred, for example, when treating solutions containing 20% or more glycerine, to extract with tertiary amyl alcohol at roughly 25° C., but in extracting aqueous glycerines of approximately 50% glycerine content or higher, one may use temperatures of roughly 50° C. and higher, depending upon the circumstances. In treating dilute glycerine solutions below 20% glycerine or where the desired object is to remove the water selectively from the glycerine, it is preferred to extract at temperatures between 0° C. and 25° C., usually about 5° C. to 8° C.

It will be understood that the percentage extraction of glycerine and the concentration of the glycerine in the extract resulting from a single contact with a specified quantity of tertiary amyl alcohol is not complete and is limited by an equilibrium distribution between the two layers which depends on such conditions as concentration and temperature. In other words, the best recovery of glycerine or separation of water and glycerine is usually not obtainable in a single contact. While one may reduce the glycerine content (or the water content, as the case may be) of the aqueous layer to a low degree and obtain a high percentage removal of glycerine in a single contact or a multiple series of simple contacts with fresh solvent, this usually requires a much larger quantity of solvent and hence quantity of heat to remove it from the extract than it is usually desirable to employ. Further, it results in a lower concentration of glycerine relative to water in the extract than it is usually desirable to obtain. It is therefore preferred, in order to obtain a high percentage recovery of glycerine and at the same time greatly reduce the quantity of solvent necessary and increase the concentration of glycerine relative to water and solvent in the solvent layer, to extract countercurrently in a multiple series of contacts, or countercurrently and continuously. In this way the quantity of solvent may be so adjusted in relation to the number of contacts as to obtain the desired percentage recovery of glycerine under any specified circumstances in the maximum possible economic and efficient manner.

When it is desired to increase the concentration of glycerine or water in the solvent layer beyond that which is in equilibrium with the feed, a portion of the more concentrated extract from which solvent has been removed may be returned to the extract end of the system as reflux. In such cases the feed of aqueous glycerol is at some intermediate point in the extraction system. The proportion of reflux, of course, must be reasonable in order economically to operate the process. In any case it must not be greater than that amount which causes complete miscibility in the last stages of extraction. Further, where it may be desirable to have the salts or alkali content of the extracted glycerine even lower than that obtained in equilibrium with the original crude feed, it is possible to return a small portion of the solvent-free extract or extract just saturated with solvent to the extraction system to reflux such substances down to the aqueous residue and thus reduce the quantity of such inorganic substance in the glycerine extract. This principle of reflux may be applied to any of the procedures herein described.

The charts in the drawings, Figures 1 to 5, which are based on extensive experimental data, may be used to determine the selectivity of tertiary amyl alcohol at various temperatures; the range of compositions of tertiary mixtures of tertiary amyl alcohol, glycerine and water within which operation is possible, the proportion of, and the concentrations in, the various phases, extracts and residues; the maximum glycerine-to-water ratio obtainable with reflux and without reflux and a given feed; the number of stages necessary to effect a particular separation; the quantity of tertiary amyl alcohol required to obtain the desired degrees of extraction; and various other data. In order to discuss the importance and necessity for these curves, the chart for tertiary amyl alcohol at 48.6° C. (Figure 1) will be considered in detail, but the remarks apply with equal weight to the other charts.

As may readily be seen, the glycerine is completely miscible with the alcohol and with the water but it is not miscible completely with all mixtures of these two. Only mixtures falling within the area marked out by the curve will separate into two layers. Accordingly, in practicing this invention the proportion of solvent used must be so adjusted as to give a total mixture falling within the area bounded by the binodal curve. This chart may be used to determine what proportions of solvent may be employed. One of the liquid layers contains a larger amount of water in proportion to solvent, and the other a larger amount of solvent in proportion to water. The proportion of these two phases as well as the concentration thereof may be determined by the tie lines extending between the sides of the binodal curve across the area of immiscibility. For example, a mixture of 25% tertiary amyl alcohol and 75% of a 69% aqueous glycerol (i. e., 25% tertiary amyl alcohol, 52% glycerol and 23% water) falls within the area of immiscibility and will separate into two phases. The composition of the two phases is determined by the extremities of a tie line A—B passing through the point X representing the over-all composition of the mixture, which shows the solvent phase (extract) to contain 59% alcohol, 35% glycerol and 6% water (i. e., 59% alcohol and 41% of an 85% glycerol). The aqueous phase (raffinate) contains 6% alcohol, 61% glycerol and 33% water (i. e., 6% alcohol and 94% of 65% glycerol). In other words, the aqueous glycerol is much more highly concentrated in the solvent layer than in the aqueous layer. Thus the solvent is glycerine-selective under these conditions of operation. This selectivity can also be established by extending the tie line A—B toward the left, and determining that it cuts the solvent-glycerine axis rather than the solvent-water axis. If it cuts through the solvent corner it is not selective, and if it cuts through the solvent-water line it is water-selective. It will be observed that from the tie lines shown, at higher concentrations at 48.6° C., tertiary amyl alcohol is glycerine-selective. At about 41% glycerol, it is non-selective, and at lower concentration it is water-selective. The proportion of solvent layer to water layer is determined by the ratio of line XB to line XA. The actual quantities of each may be calculated from the known charges and composition of the layers. The maximum glycerine (or water) separation obtainable with a given feed and without reflux, employing countercurrent extraction to best efficiency, is determined by drawing a line from the glycerine feed concentration on the glycerol-water axis to the solvent corner of the diagram. At the intersection of this line with the side of the binodal curve representing the aqueous phase, a tie line is drawn. At the point of intersection of this tie line with the solvent phase portion of the curve is the concentration of the extract in equilibrium with the aqueous phase at the point of feed. A line drawn from the solvent corner through this point will intersect the glycerine-water side of the triangle at the maximum concentration obtainable from the extract without reflux. The maximum concentration of the aqueous glycerine obtainable from the extract with reflux is found by drawing a line through the solvent corner tangential to the curve; and where it strikes the glycerine-water axis is the maximum concentration of aqueous glycerol obtainable with the solvent.

In operating the extraction process on a feed of given composition, the quantity of solvent which is required to obtain a specified recovery of the glycerine in this feed depends upon the number of contacts employed, or vice versa, with a specified quantity of solvent and number of stages, the degree of recovery obtainable will be fixed. With countercurrent, multiple-contact operation the maximum concentration of extract as pointed out above is theoretically obtainable together with complete recovery if the quantity of solvent be sufficient, which is not the case in simple multiple-contact operation. The maximum quantity of solvent which need ever be employed occurs for single contact operations and this cannot exceed the quantity limits fixed by the miscibility region of the phase chart. With a specified quantity of solvent, the degree of recovery of glycerine is improved as the number of contacts is increased, but there is a limiting degree of recovery for a fixed extract concentration beyond which one cannot go with this quantity of solvent even though an infinite number of contacts is employed. If substantially complete recovery is desired there is a minimum quantity of solvent with which this can be accomplished. In practice the quantity of solvent utilized will depend upon the number of contacts which it is desired to use. Any of these factors can be calculated from the phase charts forming a part of the present specification by the method of Hunter and Nash (J. S. C. I. 53, 95 T, 1934).

The diagrams of Figures 2 and 3 represent the ternary systems employing tertiary amyl alcohol at 7.6° C., and 25° C.

In separating water and glycerine with tertiary amyl alcohol, it is desirable to recover the solvent not only from the extract layer but also the solvent which may be dissolved in the raffinate layer. This may be done by extraction of the tertiary amyl alcohol from the primary extract and residue layers with a suitable secondary solvent. The latter dissolves the primary solvent preferentially and preferably is almost completely immiscible with both water and glycerine and has a boiling point differing considerably from that of the primary solvent. Recovery of the tertiary amyl alcohol from mixtures thereof with the secondary solvent may be by distillation.

As an example, in removing the solvent from tertiary amyl alcohol extracts by evaporation under reduced pressure, it has been ascertained that water vaporizes off at low temperature as a constant boiling mixture with the alcohol and is largely removed with the first portions of the solvent in the first stages of the evaporation, leaving behind a solution of very strong glycerine in alcohol. Evaporation may be continued to remove the residual alcohol or it may then be removed by the method of secondary extraction. The constant boiling mixture of water and alcohol separates into two layers on condensation and the two may be separated by decantation; complete separation of the water from the alcohol is ordinarily unnecessary as the wet solvent may be reused in the extraction.

It has been found advantageous to remove and recover the tertiary amyl alcohol from extracts and residues in the solvent extraction of glycerine by extracting the tertiary amyl alcohol by a secondary extraction with a second solvent specifically selected for the purpose. This is particularly true since the tertiary amyl alcohol is slightly less volatile than water, and especially in the recovery from the predominantly aqueous residues it eliminates the necessity for the vaporization of large amounts of water having a high latent heat of vaporization. Distillation of the high-boiling solvents would also involve the heating of the glycerine present above normal temperatures. The secondary solvent may be so selected as to make its separation and recovery from the primary solvent relatively easy and simple.

In using a secondary extraction to remove and recover the primary solvent as part of the extraction processes for glycerine, the secondary solvent is brought into contact with the aqueous residue to remove its solvent and then into contact with the extract and subsequently the primary and secondary solvents are separated and recovered for reuse by distillation. While as the secondary solvent one might employ any solvent dissolving the primary solvent in preference to glycerine or to water and glycerine, it is preferred to use one essentially immiscible with water and glycerine and having a boiling point either considerably higher or lower than the primary solvent. For example, as secondary solvents one may employ hydrocarbons as kerosene, solvent naphtha, or other petroleum fractions, benzene, toluene, xylene; chlorinated and nitrohydrocarbons; high molecular weight ethers and chlorinated ethers, e. g., dibutyl ether, dichloro-di-ethyl ether; and highly water-selective solvents and others. The secondary extraction may be accomplished at the same temperature or at temperatures substantially different from those for optimum operation of the primary extraction.

A still further recovery system is to take advantage of the change in solubilities with changes in temperatures. For example, it is possible selectively to extract water from aqueous glycerol by means of tertiary amyl alcohol at relatively low temperature, e. g., 7.6° C., and then to warm the aqueous layer containing say about 9% tertiary amyl alcohol to about 25° C., at which temperature about 7% of the mixture separates out as a supernatant layer having a tertiary amyl alcohol content of about 72%, and an even higher glycerine-to-water ratio.

Tertiary amyl alcohol may also be used where purification and freedom from salt is the major object and concentration of the aqueous glycerine solution is secondary. For such a process an extraction procedure is used in which the feed of aqueous glycerine is first extracted with tertiary amyl alcohol at higher temperatures partially or fully saturated with water. The extract is then free of most of the water-soluble impurities. The extract may next be re-extracted with water preferably at lower temperature, say 15° C. and below, in order to strip the glycerine from the solvent. The recovered solvent is water-saturated, as is desirable for the first stage of the extraction, and is then ready for reuse. The aqueous glycerine is substantially free of water-soluble impurities. This method of using tertiary amyl alcohol effects substantial purification without the necessity of heat expenditure, and reduces steam and chemical costs in purification. Where salt content is not as important as removal of other impurities a similar process may be operated but using a sodium chloride brine for the re-extractor.

In order to illustrate the principles of this invention, the following examples are given. These are not, however, to be construed as limiting on the scope thereof or to cover all possible methods and operations using tertiary amyl alcohol to extract aqueous glycerine solutions.

Examples 1 to 9 inclusive, below, show results obtained by single contact batch extractions of aqueous glycerine containing no salts or alkalies under the conditions set forth and using tertiary amyl alcohol as the extracting solvent. Example 10 illustrates the extraction of aqueous glycerine by a simple, multiple-contact method of operation. The results will vary in degree with changes in temperature, glycerine concentration, quantity of solvent employed, and quantity of salt present, if any.

The procedure in these examples comprises the intimate mixing of the aqueous glycerine with the solvent at the desired operating temperature and permitting the mixture to stand at the same temperature until a settling of the two phases sufficient to permit their separation takes place. The phases are removed from one another. The compositions of the raffinate and extract are determined. The solvent is removed from the raffinate and from the extract by extraction with toluene (or kerosene) to yield a concentrated glycerine and a depleted aqueous glycerine.

Examples 11, 12, 13 and 14 illustrate the extraction of impure aqueous glycerines of various concentrations containing salt impurities with tertiary amyl alcohol. The solvent is removed from the raffinate and from the extract by distillation or by extraction, or by a combination of both procedures, to yield a concentrated glycerine and a depleted aqueous glycerine.

Example 1

[Tertiary amyl alcohol saturated with water at 48.6° C.]

|  | Wt. gms. | Per Cent Glycerine | Per Cent Water |
|---|---|---|---|
| Feed | 100 | 14.0 | 86.0 |
| Solvent | 100 |  |  |
| Extract | 112.2 |  | 15.9 |
| Solvent-free extract | 19.14 | 1.84 | 15.2 |
| Raffinate | 87.8 | 10.5 | 89.5 |
| Solvent-free raffinate | 80.9 | 10.9 | 81.2 |
| Glycerine recovery 14.7% |  | 12.0 | 88.0 |

Example 2

[Dry tertiary amyl alcohol at 25° C.]

|  | Wt. gms. | Per Cent Glycerine | Per Cent Water |
|---|---|---|---|
| Feed | 100.0 | 49.8 | 50.2 |
| Solvent | 100.0 |  |  |
| Extract | 133.6 |  |  |
| Solvent-free extract | 39.2 | 18.2 | 10.8 |
| Raffinate | 64.4 | 61.8 | 39.0 |
| Solvent-free raffinate | 63.0 | 39.0 | 57.0 |
| Glycerine recovery 48.5% |  | 40.5 | 59.0 |

Example 3

[Dry tertiary amyl alcohol at 48.6° C.]

|  | Wt. gms. | Per Cent Glycerine | Per Cent Water |
|---|---|---|---|
| Feed | 100.0 | 75.0 | 25.0 |
| Solvent | 72.5 |  |  |
| Extract | 118.2 |  |  |
| Solvent-free extract | 48.5 | 35.0 | 6.0 |
| Raffinate | 54.3 | 85.0 | 15.0 |
| Solvent-free raffinate | 51.6 | 61.8 | 33.2 |
| Glycerine recovery 55.2% |  | 65.0 | 55.0 |

Example 4

[Tertiary amyl alcohol 48.6° C.]

|  | Wt. gms. | Per Cent Glycerine | Per Cent Water |
|---|---|---|---|
| Feed | 100 | 11.0 | 89.0 |
| Solvent | 170.5 |  |  |
| Extract | 198.0 |  |  |
| Solvent-free extract | 33.75 | 1.84 | 15.2 |
| Raffinate | 72.5 | 10.5 | 89.5 |
| Solvent-free raffinate | 66.7 | 10.9 | 81.2 |
| Water recovery 33.8% |  | 12.0 | 88.0 |

Example 5

[Tertiary amyl alcohol 48.6° C.]

|  | Wt. gms. | Per Cent Glycerine | Per Cent Water |
|---|---|---|---|
| Feed | 100 | 45.0 | 55.0 |
| Solvent | 104 |  |  |
| Extract | 128 |  |  |
| Solvent-free extract | 29.5 | 10.6 | 12.4 |
| Raffinate | 76.0 | 46.2 | 53.8 |
| Solvent-free raffinate | 70.8 | 41.3 | 51.8 |
| Glycerol recovery 30.2% |  | 44.0 | 56.0 |

Example 6

[Tertiary amyl alcohol 25° C.]

|  | Wt. gms. | Per Cent Glycerine | Per Cent Water |
|---|---|---|---|
| Feed | 100 | 9.0 | 91.0 |
| Solvent | 66.7 |  |  |
| Extract | 71.0 |  |  |
| Solvent-free extract | 13.8 | 1.7 | 17.8 |
| Raffinate | 96.0 | 8.7 | 91.3 |
| Solvent-free raffinate | 92.2 | 10.0 | 86.0 |
| Water recovery 13.9% |  | 10.4 | 89.6 |

Example 7

[Tertiary amyl alcohol 7.6° C.]

|  | Wt. gms. | Per Cent Glycerine | Per Cent Water |
|---|---|---|---|
| Feed | 100 | 10.5 | 89.5 |
| Solvent | 122.2 |  |  |
| Extract | 140.0 |  |  |
| Solvent-free extract | 28.2 | 1.9 | 18.2 |
| Raffinate | 82.2 | 9.5 | 90.5 |
| Solvent-free raffinate | 71.5 | 9.75 | 77.2 |
| Water recovery 28.4% |  | 11.0 | 89.0 |

Example 8

[Tertiary amyl alcohol 7.6° C.]

|  | Wt. gms. | Per Cent Glycerine | Per Cent Water |
|---|---|---|---|
| Feed | 100 | 42.0 | 58.0 |
| Solvent | 64 |  |  |
| Extract | 71.3 |  |  |
| Solvent-free extract | 15.75 | 8.05 | 14.0 |
| Raffinate | 92.7 | 36.6 | 63.4 |
| Solvent-free raffinate | 84.4 | 39.4 | 51.8 |
| Water recovery 17.2% |  | 43.0 | 57.0 |

Example 9

[Tertiary amyl alcohol 7.6° C.]

|  | Wt. gms. | Per Cent Glycerine | Per Cent Water |
|---|---|---|---|
| Feed | 100 | 14.0 | 86.0 |
| Solvent | 88.7 |  |  |
| Extract | 96.6 |  |  |
| Solvent-free extract | 19.4 | 1.9 | 18.2 |
| Raffinate | 92.1 | 9.5 | 90.5 |
| Solvent-free raffinate | 80.0 | 9.75 | 77.2 |
| Water recovery 20.5% |  | 11.0 | 89.0 |

Example 10

100 grams of 16.2% aqueous glycerine, salt-free, is extracted at room temperature with 1200 grams of water-saturated tertiary amyl alcohol in a six-stage simple multiple-contact operation with the solvent divided equally between the stages. Analysis of the aqueous residue from the last stage shows a negligible amount of glycerine thus showing the complete stripping and recovery of glycerine from an aqueous starting mixture by extraction with the solvent. The glycerine is recovered from the extract by evaporation of the water and solvent.

Example 11

A crude commercial concentrated glycerine was extracted with approximately equal quantity of dry tertiary amyl alcohol solvent in a single batch contact at 25° C. The crude feed contained approximately 75–80% glycerine, was practically saturated with salt, and was opaque, dark greenish black in color and evil-smelling. A large quantity of salt was precipitated and recovered from the mixture during the extraction. The extract analyzed 17% glycerine and 0.25% salt and was clear and practically colorless. After removal of the alcohol solvent by extraction with toluol, the solvent-free product was clear, odorless, and contained 82% glycerine and 1.18% salt.

Example 12

A sample of the same crude glycerine is similarly extracted with tertiary amyl alcohol in the same manner at 75° C. The extract analyzes 19.8% glycerine, 4.6% water and 0.94% salts, and is about the same in color as above. After extraction of the alcohol solvent with toluol, the solvent-free product was clear and contained 82% glycerine and 0.9% salt. A portion of the extract from the above is partially vacuum evaporated to remove water and some of the alcohol. The remaining alcohol is extracted with toluol, giving a clear glycerine of better than 90% glycerine content.

The recovery of glycerine is appreciably increased by countercurrent multiple-contact, continuous countercurrent, or even simple multiple-contact extraction with tertiary amyl alcohol.

The following group of examples illustrates the application of the method to simple multiple-contact operation:

Example 13

A crude dilute soap lye containing 8.73% glycerine and 6.6% salt, and which is dark, muddy, reddish-brown in color and evil-smelling, is extracted at room temperature with tertiary amyl alcohol half saturated with water in a four-stage simple multiple-contact operation, using a solvent ratio of two in each stage. The aqueous residue from the final stage contains 3.74% glycerine after removal of the solvent. The combined extracts from the four stages are practically colorless and contain about 0.01% salt. A portion of this dilute extract is extracted with toluol and the alcohol solvent completely removed, yielding a dilute colorless extracted glycerine. A second portion of the extract is vacuum evaporated to a final temperature of about 38° C. In this process water comes off first as a constant boiling mixture with the alcohol. About 80% of the original extract is evaporated off and the last portions of alcohol solvent removed from the residue by extraction with toluol. The final product is very light in color and contains about 95% glycerine.

Example 14

500 grams of a soap lye containing 7.79% glycerine and 11.4% salt is extracted at room temperature with tertiary amyl alcohol containing 0.08 part of water in an eight-stage simple multiple-contact operation with 1000 grams of fresh solvent per stage. The crude starting lye is alkaline, dark reddish-brown in color and contains suspended soap and solid materials. 8169 grams of combined extracts result which are clear and practically water white. The aqueous residue from the last stage weighs 243 grams and contains 2.45% glycerine and about 20–23% salt. The glycerine recovery in the extract is approximately 85% of that in the soap lye feed. A portion of the combined extract is extracted with toluol and the alcohol solvent removed, yielding a colorless dilute glycerine. A second portion of the extract is vacuum evaporated to a temperature of about 37° C., until about 90% is evaporated off. The water content is largely removed in the first condensate as a constant boiling mixture with the alcohol. The concentrated glycerine-alcohol residue from the evaporation is extracted with solvent naphtha and the residual alcohol solvent removed. The product is a concentrated neutral substantially salt-free glycerine, containing about 98–99% glycerine.

In order to show the distribution of glycerine between the extract layer and the raffinate layer, the distribution chart shown in Figure 4 has been prepared. The data for this chart was obtained by treating various concentrations of aqueous glycerine solution with tertiary amyl alcohol at 7.6°, 25° and 48.6° C., separating the liquid phases and analyzing the extract and the raffinate for their glycerine content. In studying this chart, the fact that in giving the concentration of glycerine in the extract layer, the percentage is based upon the total content of this layer, which includes the solvent, should be kept in mind. Thus, although the figures show a lower percentage of glycerine in the solvent layer than in the raffinate layer, the glycerine solution is frequently more concentrated in the extract. The value of the distribution chart lies in its showing of the shape of the curves. At the higher temperatures and concentrations the percentage of glycerine in the extract layer rises rapidly in relation to the glycerine content of the raffinate. However, at the higher temperatures the solvent becomes less glycerine-selective.

Figure 5 is a selectivity chart showing the actual proportions of glycerine to water existing in the extract layer and in the raffinate layer on a solvent-free basis as the result of extractions of aqueous glycerine solutions of various concentrations with tertiary amyl alcohol at temperatures of 7.6°, 25° and 48.6° C. The dotted reference line indicates non-selectivity of the solvent, that is, the proportion of glycerine to water in the extract is the same as in the raffinate. Where the curves lie below the reference line, the tertiary amyl alcohol is being used under conditions wherein it is water-selective, and where the curve lies above the reference line, the solvent is glycerine-selective. The curves show three general characteristics of tertiary amyl alcohol as a solvent for concentrating glycerine in aqueous solutions thereof:

(1) At very low concentrations of glycerine tertiary amyl alcohol is water-selective.

(2) At temperatures somewhat under normal room temperature, tertiary amyl alcohol is water-selective at least up to concentrations of 70% or 80% of glycerine.

(3) At temperatures somewhat above room temperature and at concentrations of over 20% to 40% (the exact value depending upon the temperature) tertiary amyl alcohol is glycerine-selective. The chart also shows that this glycerine selectivity rises rapidly as the concentration increases.

Figure 6:
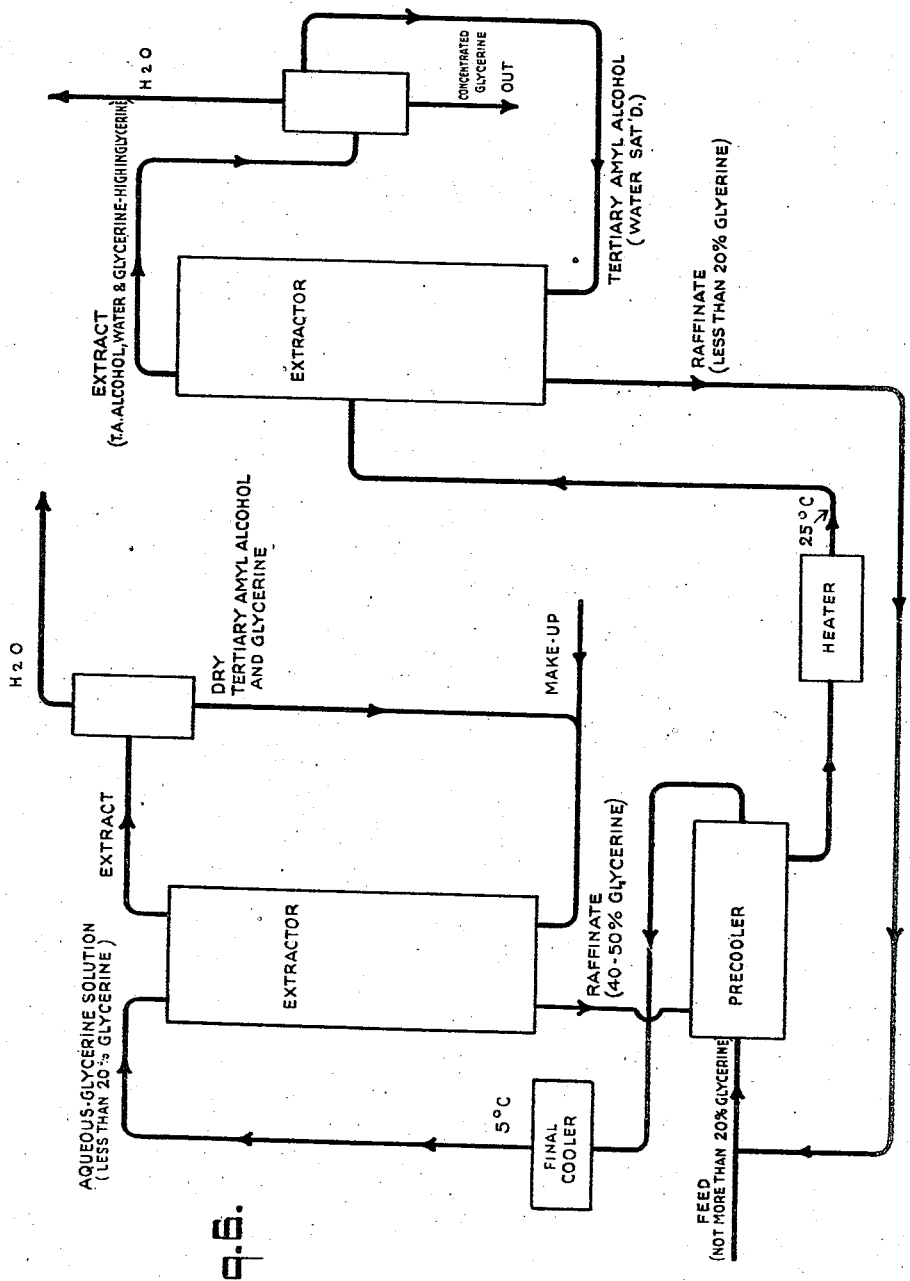

Figure 6 illustrates a process of concentrating glycerine in which the solvent properties of tertiary amyl alcohol at low temperatures and low concentration of glycerine are shown to be different from those at high temperatures and high concentration of glycerine. This difference in the selectivity of tertiary amyl alcohol is utilized in the process of this figure. The feed is an aqueous glycerine solution containing less than 20% glycerine. It is passed through a precooler to reduce the temperature of the feed, and then through a final cooler in which the temperature is further reduced to about 5° C. From the final cooler the aqueous glycerine solution is passed into an extractor, where it is contacted, preferably in a continuous countercurrent manner, with tertiary amyl alcohol. The tertiary amyl alcohol used as the solvent at the temperature (5° C.) and concentration of glycerine (less than 20%) is selective for water. The extract is passed into a separator, preferably a still, where the water and the tertiary amyl alcohol are separated, any glycerine included in the extract being retained in the tertiary amyl alcohol. This tertiary amyl alcohol is recycled through the extractor as the extracting solvent. Any alcohol lost in the separator is replenished before the alcohol is returned to the extractor. Since the tertiary amyl alcohol is selective for water under the conditions specified, the raffinate contains a greater percentage of glycerine than was contained in the feed, possibly 40% to 50% glycerine. This raffinate, being at a lower temperature than the feed, is passed through the precooler in indirect contact with the feed where it absorbs some of the heat contained in the feed. After passing through the precooler, the concentrated glycerine solution is heated to a temperature of about 25° C. and is again extracted with tertiary amyl alcohol (water-saturated), preferably in a continuous countercurrent manner. At this temperature and at the higher concentration, tertiary amyl alcohol is glycerine-selective, and the extract contains a still higher concentration of glycerine as well as a low percentage of water. The extract is passed into a separator, preferably of the type of a still, where water, tertiary amyl alcohol and concentrated glycerine are separated, the tertiary amyl alcohol being recycled to the extractor as the extracting solvent. The raffinate, being of a relatively low concentration of glycerine (less than 20%), is returned to the original feed line. The glycerine is of high concentration, and may be further concentrated or purified by distillation or by further solvent extraction.

The charts were prepared on the basis of solutions of glycerine in ordinary water. In dealing with aqueous solutions containing considerable amounts of inorganic or organic impurities, or in the presence of other solvents, results differing in degree will be obtained. For example, at salt concentrations up to about 5% by weight, a slightly higher concentration of glycerine in the extract layer is obtained, while at higher salt concentrations (10% to 15%), the concentration of glycerine in the extract is reduced somewhat.

The processes of this invention may be varied by employing addition agents, organic and/or inorganic, to affect the selectivity of and concentration in the solvent. Twitchell reagents, other aromatic sulphonic acid salts, other organic or inorganic acids, bases or salts may be added for this purpose.

The process is applicable to the recovery of polyhydric alcohols other than glycerine, such as mannitol, sorbitol, erythritol, dulcitol, beta methyl glycerine, ethylene glycol, diethylene glycol, propylene glycol, butylene glycol; 1,4-pentandiol; 1,2,5-pentantriol; hexoses, and other sugars, and in fact any polyhydroxy organic material.

This application is a continuation-in-part of applicant's prior application Serial No. 349,595, filed August 2, 1940.

As many widely different embodiments of the present invention may be made without departing from the spirit or scope thereof, it is not to be limited except as defined in the following claims.

I claim:

1. The process of recovering glycerine from an aqueous solution thereof which comprises contacting an aqueous-glycerine solution containing from 15 to 85% glycerine with tertiary amyl alcohol, the ratio of the alcohol to the aqueous-glycerine solution being between 2:3 and 12:1, at a temperature between 35° C. and 60° C., separating the liquid layers which form, and contacting the layers separately with a secondary solvent which dissolves tertiary amyl alcohol but which is substantially immiscible with water and with glycerol.

2. The process of recovering glycerine from an aqueous solution thereof which comprises contacting an aqueous-glycerine solution containing from 15 to 85% glycerine with tertiary amyl alcohol, the ratio of the alcohol to the aqueous-glycerine solution being approximately 1:1, at a temperature between 35° C. and 60° C., separating the liquid layers which form, contacting the layers separately with a secondary solvent which dissolves tertiary amyl alcohol but which is substantially immiscible with water and with glycerol and separating the liquid layers which form.

3. The process of concentrating glycerine from aqueous solutions thereof containing from 20 to 85% of glycerine, which comprises contacting the aqueous-glycerine solution with tertiary amyl alcohol, the ratio of the tertiary amyl alcohol to the aqueous-glycerine solution being between about 2:3 to 2 to 1, at a temperature being between 15° C. and 75° C., separating the liquid layers that form, treating the layer containing the greater per cent of glycerol with a secondary solvent which dissolves tertiary amyl alcohol but which is substantially immiscible with water and with glycerol and separating the secondary solvent extract from the concentrated glycerine.

4. In a process for separating a liquid mixture including an organic polyhydric alcohol and water, the steps comprising extracting said mixture at a temperature between 0° and 75° C. with a liquid selective solvent comprising tertiary amyl alcohol as at least a major ingredient under conditions causing the formation of liquid raffinate and extract phases wherein one of the liquid phases so formed contains a substantial proportion of said organic polyhydric alcohol in a higher ratio to the water than that of the original mixture, separating the liquid raffinate and extract phases, and recovering organic polyhydric alcohol from that phase in which its ratio to water is higher than that of the original mixture.

5. A process as defined in claim 4 in which the extraction step is carried out in a continuous countercurrent manner.

6. A process as defined in claim 4 in which the original liquid mixture undergoing extraction contains also inorganic salt impurities.

7. In a process for separating a liquid mixture including glycerine and water, the steps comprising extracting said mixture with a liquid selective solvent comprising tertiary amyl alcohol as at least a major ingredient under conditions causing the formation of liquid raffinate and extract phases, and including extraction temperatures lying between 0° and 75° C., thereby producing a higher ratio of glycerine to water in one of the said liquid phases than that of the original mixture, separating the liquid raffinate and extract phases, and recovering glycerine from that phase in which its ratio to water is higher than that of the original mixture.

8. A process as defined in claim 7 in which the extraction step is carried out in a continuous countercurrent manner.

9. A process as defined in claim 7 in which the original liquid mixture undergoing extraction contains also inorganic salt impurities.

10. A process as defined in claim 7 in which the extraction step is carried out under temperature conditions such that the higher glycerine-water ratio is produced in the liquid extract phase.

11. A process as defined in claim 7 in which the extraction step is carried out under temperature conditions such that the higher glycerine-water ratio is produced in the liquid raffinate phase.

12. A process as defined in claim 7 in which the tertiary amyl alcohol is substantially water saturated.

JOSEPH CLIFTON ELGIN.

REFERENCES CITED

The following references are of record in the file of this patent:

UNITED STATES PATENTS

| Number | Name | Date |
|---|---|---|
| 1,078,580 | Guignard et al. | Nov. 11, 1913 |
| 1,092,791 | Guignard et al. | Apr. 7, 1914 |
| 1,147,767 | Laszloffy | July 27, 1915 |
| 1,193,951 | Laszloffy | Aug. 8, 1916 |
| 2,081,721 | Van Dijck et al. | May 25, 1937 |
| 2,194,665 | Mnookin | Mar. 26, 1940 |

FOREIGN PATENTS

| Number | Country | Date |
|---|---|---|
| 27,300 | Great Britain (1912) | Aug. 14, 1913 |
| 829,539 | France | Apr. 5, 1938 |
| 843,074 | France | June 26, 1939 |
| 850,684 | France | Dec. 22, 1939 |

OTHER REFERENCES

Grant, "Am. Jour. Pharm.," vol. 94, page 423 (1922). (Copy in Pat. Office Library.)